United States Patent Office 2,819,199
Patented Jan. 7, 1958

2,819,199

STABLE INJECTABLE FAT EMULSIONS AND PROCESS OF PRODUCING SAME

Joseph Kalish, Jamaica, N. Y., assignor to Schenley Laboratories, Inc., New York, N. Y., a corporation of Delaware No Drawing. Application October 27, 1953
Serial No. 388,677

16 Claims. (Cl. 167—66)

This invention relates to stable, injectable aqueous emulsions of bodily acceptable fats and, more particularly, to emulsions containing high concentrations of fats which are adapted for intravenous injection as a means of supplying a high caloric intake in human and animal nutrition.

It is recognized that there are many conditions in which, for emergency, convalescence or other purposes, it is necessary to provide a high caloric intake to supply necessary nutrition and thereby prevent loss of body weight or maintain or increase body weight. It has previously been proposed to supply moderate caloric intakes by intravenous injection but it has been reported that such intravenous preparations must have relatively low fat contents since increasing concentrations of fats have been shown to produce a disproportionate number of toxic and adverse side reactions in humans as well as in animals. For practical purposes, such prior intravenous fat emulsions have never contained more than a maximum concentration of approximately 20 to 30% weight/volume of fat, and usually have fat contents as low as 10 to 15% of fat. Consequently, these preparations, containing 20 to 30% of fat, represent the equivalent of only 2000 to 3000 calories per liter. While this type of intravenous preparation has some value in cases of mild malnutrition, it is not capable of solving critical feeding problems because of the large volume of liquid required for administration of a relatively limited number of calories. Moreover, many instances are encountered in which, with these relatively low concentration preparations, insufficient caloric intake in the limited liquid volume that can be administered can be provided to enable the patient to recover or gain weight, especially where the condition of the patient is critical and where adequate caloric intake may mean survival. In some cases, a maximum liquid intake of the patient must be limited to 500 milliliters, especially in cases of renal insufficiency. Prior findings by others with intravenous prepartions having low fat contents have shown that, with increasing concentrations of fat (up to 20% by weight/volume) a larger percentage of adverse side or secondary effects is encountered. For this reason it was considered that the practical upper limit of fat concentration for such preparations is approximately 20%, even though such preparations left something to be desired. Consequently a serious problem still remained which was not solved by available preparations.

The principal object of the present invention is to provide a stable, injectable aqueous fat emulsion having a high concentration of fat in the form of exceedingly small particles which is readily assimilable by human and animal bodies and which produces a minimum of adverse ancillary effects.

A further object of the present invention is to provide such an aqueous fat emulsion containing a fat content of at least 30% and ranging up to and including 55% by weight/volume of fat.

A still further object of the invention is the provision of highly concentrated injectable, homogenized fat emulsions containing at least 30% and preferably about 50% by weight/volume of fat and which are either isotonic with human blood or, being above the isotonic point, are nonetheless well tolerated.

A further object of this invention is to provide an injectable aqueous fat emulsion which has a viscosity suitable for rapid intravenous administration through a needle of relatively small diameter and which is quickly miscible with and dispersible in human and animal blood streams.

A further object of the invention is to provide such aqueous fat emulsions of minimum weight and volume, and consequently of maximum caloric potency, so that they may be transported the more readily to disaster and other sites or areas where they are needed immediately.

Other objects and advantages of the invention, some of which are referred to hereinafter, will be apparent to those skilled in the art to which the invention pertains.

The present invention is predicated upon the discovery that highly concentrated, intravenously injectable, aqueous homogenized fatty oil emulsions can be produced by going far beyond usual fat concentrations of such known intravenous fat emulsions. A whole new range of aqueous emulsions having high fat concentrations is thereby made available which are eminently suitable for emergency nutrition to prevent further loss of body weight or to maintain or increase body weight even under adverse conditions and which do not produce unfavorable ancillary effects. This invention is based upon my further discovery that a highly concentrated aqueous fat emulsion containing at least 30% and up to and including 55% of fat, can be produced and administered by intravenous injection with surprising results not heretofore achieved and not hitherto attempted or deemed possible in view of the prior knowledge with reference to increasing fat concentrations as hereinbefore mentioned.

The fat emulsion of the present invention, in one of its preferred embodiments, consists of 50% by weight/volume of refined coconut oil having a solidification point of approximately 76° F., 1½% of glyceryl monostearate and 2% of an acid-resistant polyoxyethylene sorbitan monostearate (Tween 60, having 20 polyoxyethylene units per molecule), and 5% by weight/volume of dextrose. Such an emulsion is stable and isotonic with blood and has an appropriate viscosity for intravenous injection when prepared as described herein. It is pyrogen-free, completely miscible with the human blood stream, is readily assimilated by the human and animal system. Its high fat concentration makes it particularly useful for treatment of patients who have been seriously injured or wounded in battle or as a result of accidents, subjection to overdoses of actinic radiations, and severe or prolonged malnutrition.

Tween 60 (trade name of Atlas Powder Company) is a polyoxyethylene sorbitan monostearate which is an oily liquid or semijel which is completely soluble in water. It is produced by the condensation of 20 molecular proportions of ethylene oxide with one molecular proportion of sorbitan monostearate and contains approximately 67% of oxyethylene units. Upon saponification with alkali, it yields approximately 25% of stearic acid and approximately 77% of polyhydric residue having a hydroxyl value of approximately 180 and an oxyethylene content of approximately 86%.

Although, in referring above to a preferred or exemplary composition for my new emulsion, I have referred to a 50% by weight/volume fat content, the fat content may, however, effectively range from approximately 30% to approximately 55% by weight/volume, this being a caloric value between approximately 3000 and approximately 5500 calories per liter, which provides a readily available, quickly assimilable nutritive source of a caloric value not hitherto used or deemed possible for intravenous injection. Because of this exceptionally high concentration, smaller amounts can be employed as compared to previously known intravenous preparations containing 20% or less of fat. My new intravenously injectable emulsions are rapidly and efficiently absorbed and utilized by the human and animal system.

Coconut oil is a desirable fat for use in my new emulsion, and the glycerides of coconut oil fatty acids having from 12 to 18 carbon atoms are particularly preferred. A refined coconut oil having a low acid value, a low iodine number and a solidification point of approximately 76° F. (approximately 25° C.) and molecularly distilled coconut oil are eminently satisfactory for this use.

Although coconut oil is particularly desirable, other animal and vegetable oils and fats (which are referred to herein simply as fats and which are intended to include only glycerides) can be substituted wholly or in part for coconut oil. Such suitable fats include natural peanut oil, corn oil, sesame oil, olive oil, butter fat, beef tallow, almond oil, cocoa butter, cottonseed oil, goosefat, grapeseed oil, lard and lard oil, milk fat, mutton tallow, palm oil, palm kernel oil, poppyseed oil, rabbit fat, rapeseed oil, soybean oil, sunflower seed oil and the like. All such oils normally have a solidification point below body temperature, have low or moderate iodine numbers and low acid numbers. Synthetic glycerides having similar properties may also be used. Other fats, which may produce irritation and toxic, allergic and other undesirable reactions on intravenous injection, for example, castor oil, cod liver oil, croton oil, linseed, menhaden and neat's-foot oil, are by choice avoided. The desirable oils referred to hereinbefore are all readily assimilable and when incorporated into the fat emulsions for intravenous use prepared in accordance with my invention, produce no undesirable side reactions and may be used in the specified quantities and concentrations. Unsaturated fats, that is, fats having high iodine numbers, are not of themselves less desirable than those having low iodine numbers, except insofar as they are toxic or produce undesirable side reactions or are not sufficiently absorbable or utilizable by the human body.

With regard to the monosaccharide content of the emulsions of this invention, approximately 5% by weight/volume is preferred because such an emulsion is isotonic with blood and possesses the desired viscosity characteristics. However, percentages of monosaccharides within the range of approximately 5% to approximately 10% by weight/volume have been found to be well tolerated by patients. Dextrose (glucose) is preferred, but other assimilable monosaccharides, such as fructose and invert sugar, may be substituted wholly or in part for dextrose. Sugar (sucrose) and other polysaccharides are to be avoided, however.

The content of glyceryl monostearate, which is a water-dispersible but not completely water-soluble emulsifier, in the emulsions of this invention, may vary between approximately ½% and approximately 2½% by weight/volume, and approximately 1½% is best and is preferred. In this connection, it is to be noted that two grades of glyceryl monostearate, one of which is soap-free, are commercially available. When that grade of glyceryl monostearate is used which contains a small proportion of soap, the soap aids in the emulsification and has no adverse effect. When soap-free grades of glyceryl monostearate are employed, the amount of the second or water-soluble emulsifier which is used (Tween 60, for example) should be increased slightly to compensate. The glyceryl monostearate which is referred to herein is the commercial grade which contains from approximately 30 to approximately 50% by weight of the monoglyceride, up to 50% of diglyceride and from 0 to approximately 20% of triglyceride, the fatty acid portion being a relatively pure grade of stearic acid. Another commercial grade of glyceryl monostearate is available which is referred to as "distilled" and which contains approximately 90% or more of monoglyceride. From this "distilled" grade I have been unable to prepare satisfactory emulsions in accordance with this invention.

The second emulsifying agent which was exemplified in the foregoing preferred embodiment of the invention by Tween 60, is incorporated into the emulsions of this invention to the extent of between ½% and 3% by weight/volume, with 2% being preferred. As specified hereinafter, this combination of a plurality of emulsifying agents, which is a critical feature of the emulsions of my invention, may be replaced wholly or in part by other known emulsifying agents. These other emulsifying agents include the three following commercial products:

Demal 14 (trade-name of the Emulsol Corporation), which is a polyglycerol oleate containing less than 1.5% by weight of free fatty acid (assayed as stearic acid, molecular weight 270) and less than 8% by weight of free polyglycerol; its melting point (capillary tube) is approximately 52.5–54.0° C. Its iodine number is less than approximately 65. The hydroxyl number of its water-insoluble fraction is between 190 and 220. A 3% aqueous dispersion of polyglycerol oleate has a pH between 6.0 nad 6.8.

Pluronic F68 (trade-name of Wyandotte Chemicals Corporation), which is a free-flowing white flaky powder completely soluble in water and produced by the condensation of ethylene oxide with a water-insoluble polypropylene glycol having an average molecular weight between 1501 and 1800, and which contains between 80% and 90% ethylene oxide in its molecular structure and has a molecular weight of approximately 8000. Its melting point is above 50° C. The pH of a 2.5% aqueous solution of Pluronic F68 is between 6.0 and 8.0.

Polyethylene glycol 400 monostearate, which is a soft white solid of low melting point made by the esterification of a liquid polyethylene glycol having a molecular weight between 380 and 420 with stearic acid. It is dispersible but not completely soluble in water.

In order to prepare emulsions having the compositions which are specified herein, which will be injectable without producing the disproportionate number of toxic and adverse side reactions previously observed, and which will have the requisite stability and sterility and freedom from deleterious substances, it is necessary to observe certain critical steps in the process. These include the manner of mixing the ingredients together, the treatment of the ingredients in such solvents and the treatment of the ingredients and the resulting emulsions in such manner that they are sterile and free from deleterious substances, as well as the subsequent treatment of the resulting fat emulsions in such manner that they have the requisite fineness and homogeneity. It is not normally possible to sterilize or remove pyrogenic substances from already prepared emulsions, since heat destroys the emulsions, producing coagulation and settling of the particles. Typical methods of preparing these emulsions are illustrated in the examples which follow:

*Example 1*

To prepare the preferred intravenously injectable fat emulsion referred to hereinbefore, the following materials in the quantities specified are used, the parts being by weight:

50 parts refined coconut oil, having a melting point of 76° F., which may have been further purified by molecular distillation.

1.5 parts glyceryl monostearate having a soap content of approximately 1.5%.

2 parts Tween 60 (polyoxyethylene sorbitan monostearate having approximately 20 oxyethylene units per molecule).

5 parts dextrose (from a sterile 50% stock solution).
Water (distilled and pyrogen-free) to make 100 parts by volume.

The foregoing ingredients are preliminarily subjected to purification in the following manners:

The fatty oil must be sterile and substantially free from deleterious substances. It is obtained in this condition by treatment with adsorbent carbon at a temperature of approximately 50° C., followed by filtration through a sterilizing filter. The product may be further purified, when necessary, by thorough washing with pyrogen-free sterile distilled water at prevailing room temperatures, followed by heating of the oil at a sterilizing temperature (110° to 120° C.) for a period adequate to render it sterile. When molecularly distilled oils are used, they, too, should be subjected to one or the other of the foregoing treatments.

The glyceryl monostearate and the polyoxyethylene ester emulsifying agent (Tween 60) must also be sterile and free from deleterious substances. These conditions are achieved by treatment of these substances, individually or in admixture with each other, in solution in ethyl alcohol, acetone or other suitable solvent, with adsorbent carbon, followed by filtration through a sterilizing filter and subsequent complete removal of the solvent by evaporation at a subatmospheric pressure at a temperature above prevailing room temperature. The solution is preferably as concentrated as feasible so as to minimize the amount being treated and also to reduce losses by adsorption. The preferred solvent for this treatment is ethyl alcohol because of its lack of toxicity in proportions that might be retained by the solid after its evaporation. For this reason also, low-boiling solvents which are non-toxic are preferred. The solvent may contain water to an extent which does not interfere with the dissolving of the glyceryl stearate.

The dextrose is purified by preparing a relatively concentrated (50% by weight) stock solution to which adsorbent carbon is added and which is then filtered to remove the carbon. This clarified solution is then sterilized by autoclaving at approximately 120° C. for a period adequate to produce sterility. The dextrose and other monosaccharides are dispensed in the form of such concentrated syrupy stock solutions.

The foregoing purified ingredients are then combined in the following manner, using sterilized equipment throughout the operations and observing all precautions that are normal complements of aseptic technique.

The indicated proportions of the various specified components are combined under sterile conditions in a clean heated kettle and are then heated to the boiling point while being stirred continuously. The emulsion is then allowed to cool back to approximately 60° to 70° C. The globules of the emulsion are then broken down into smaller sizes by being passed, while at a temperature of approximately 60° C., through a sterilized homogenizing apparatus such as colloid mills, high-pressure homogenizers, viscolizers or by ultrasonic or other suitable means, the homogenization being continued, maintaining sterile conditions at all times, by recycling of the emulsion, if necessary, until the particle size of the globules is approximately 1 micron or less and the emulsion contains no particles greater in size than 2 microns.

The resulting emulsion is then dispensed into sterile bottles and sealed. It is a milky liquid which is isotonic and quickly miscible with human blood and is remarkably stable to oxidation and storage for long periods. It can be injected through a needle of small diameter and does not agglomerate substantially on standing or when injected into the blood stream. The stability of such emulsions and their tendency to agglomerate into particles greater than 7 microns, the normal average size of erythrocytes of the blood, I believe to be largely controlled by the particular type of emulsifying agents which they contain. The emulsifying agents which are used in the compositions of my present invention are such as are substantially unaffected by hydrolysis or the presence of ionized salts. The emulsion has a viscosity between 85 and 125 centipoises at 25° C.

*Example 2*

An injectable aqueous fat emulsion is prepared as described in Example 1, from the following ingredients, which are each treated preliminarily and dispensed in the form described in Example 1:

50 parts of refined peanut oil
5 parts of invert sugar (dispensed as a 50% sterile aqueous solution)
1 part of Pluronic F68, as described above
1 part of Demal 14, as described above
Water to make 100 parts by volume The resulting emulsion is physically identical with that of Example 1. Its stability is of the same order. Both the emulsifying agents of this emulsion are recognized to be of low toxicity. The viscosity of the emulsion is within the range of 80 to 125 centipoises at 25° C.

*Example 3*

By using the following ingredients in the specified proportions:

50 parts of refined sesame oil
5 parts of fructose (dispensed in 50% aqueous solution)
1 part of Tween 60
1 part of Pluronic F-68
1 part of polyethylene glycol 400 monostearate
Water to make 100 parts by volume and preliminarily purifying and sterilizing each of the ingredients and combining them as described in Example 1, an emulsion is obtained which is substantially physically identical with that of Example 2. Its viscosity is within the range of 80 to 125 centipoises at 25° C.

Besides the three pairs or combinations of emulsifying agents specified in the preceding three examples, namely, (1) Glyceryl monostearate and Tween 60,
(2) Pluronic F68 and Demal 14, and
(3) Pluronic F68 and Tween 60, I may use combinations of polyethyleneglycol 400 monostearate with, respectively, Tween 60 and Pluronic F68. A portion of the components of these mixtures of emulsifying agents may be replaced by a portion of one or more emulsifying agents, including other emulsifying agents than the five specifically referred to herein. All of the foregoing emulsifying agents are of the non-ionic type and are recognized to be essentially nontoxic.

Although it might be expected that a satisfactory emulsion of this character could be made by the use of but one emulsifying agent, all efforts in this direction have thus far been unsuccessful. Normally, an emulsifying agent is capable only of stabilizing one type of emulsion, namely, an oil-in-water or a water-in-oil emulsion, but of the many emulsifying agents of both types that were tried, neither alone produced the desired effect. The emulsion of this invention is an oil-in-water emulsion. Emulsions produced with a single emulsifying agent lacked stability and, in some cases, were much too thick or viscous for intravenous injection.

Tween 60, Pluronic F68, Demal 14, and polyethylene glycol monostearate favor the production of oil-in-water emulsions while soap-free glyceryl monostearate favors the production of water-in-oil emulsions, that is, pastes such as are useful in the production of lotions and creams.

Emulsions prepared by using only one of the emulsifying agents specified herein, namely, Tween 60 or Pluronic F68, are good when freshly prepared but are deficient in stability, the emulsion breaking relatively rapidly. Glyceryl monostearate containing soap yields an emulsion which is not sufficiently stable and whose viscosity may be too great, while glyceryl monostearate without soap produces only unstable water-in-oil type emulsions. Demal 14, when used alone, yields only a poor emulsion which tends to separate quickly.

Lecithin and similar known emulsifying agents produce emulsions which lack stability or subsequently develop toxicity.

Of the five emulsifying agents specified hereinbefore, Pluronic F68 and Tween 60 each dissolves in water to give clear solutions. Demal 14 and polyethylene glycol 400 monostearate, however, are each readily dispersible, but not completely soluble, in water to give cloudy solutions, while soap-free glyceryl monostearate is water-insoluble and soap-containing glyceryl monostearate is water-dispersible, being a useful constituent of lotions and creams.

It was suspected that, since glyceryl monostearate together with Tween 60 produces one of the most stable emulsions, the requisite of such emulsifying agent combinations was the presence of an agent which favors the production of an oil-in-water emulsion together with one that favors the production of a water-in-oil emulsion. However, both Tween 60 and Pluronic F68 favor the production of oil-in-water emulsions and yet, when used together, they produce satisfactory emulsions in accordance with this invention.

It was also considered that, in using a combination of emulsifying agents, one of the emulsifying agents should be water-soluble while the other was merely water-dispersible. But such is not the case, since Pluronic F68 and Tween 60, both of which are water-soluble, when used together, produce satisfactory emulsions. Apparently, however, one of the emulsifying agents of the combination should be completely soluble in water to form a clear solution, and the stability of the emulsion, its viscosity, and its other desirable properties, are controlled otherwise more by the peculiar nature of the individual emulsifying agents themselves than by any apparent theories of emulsification or their particular physical or chemical characteristics.

Inasmuch as the foregoing specification consists of preferred embodiments of the invention which were selected primarily for purposes of illustration, it is to be understood that the invention is not restricted thereto, and that modifications and variations may be made therein in conventional manner and in accordance with the teachings herein. The invention accordingly is to be limited solely by the scope of the appended claims.

I claim:

1. A stable, non-toxic, bodily acceptable and assimilable, injectable fat emulsion comprising (1) between approximately 30% and approximately 55% by weight/volume of a non-toxic, non-irritating fat, (2) between approximately 5% and approximately 10% by weight/volume of an assimilable monosaccharide, and (3) both of the constituents of a pair of emulsifying agents selected from the group consisting of: (a) glyceryl monostearate and polyoxyethylene sorbitan monostearate having 20 polyoxyethylene units per molecule, (b) the condensation product of ethylene oxide and polypropylene glycol and polyglycerol oleate, (c) the condensation product of ethylene oxide and polypropylene glycol and polyoxyethylene sorbitan monostearate having 20 polyoxyethylene units per molecule, (d) polyethylene glycol 400 monostearate and polyoxyethylene sorbitan monostearate having 20 polyoxyethylene units per molecule, and (e) polyethylene glycol 400 monostearate and the condensation product of ethylene oxide and polypropylene glycol, each of the constituents of the said pair being present in an amount between approximately ½% and approximately 3% by weight/volume of the emulsion, and the average size of the particles of said emulsion being smaller than 2 microns and the emulsion being sterile and free from pyrogenic substances.

2. An injectable fat emulsion as defined in claim 1, in which the fat is a glyceride.

3. An injectable fat emulsion as defined in claim 1, in which the fat is refined coconut oil.

4. An injectable fat emulsion as defined in claim 1, in which the monosaccharide is dextrose.

5. An injectable fat emulsion as defined in claim 1, in which the fat is refined coconut oil and the monosaccharide is dextrose.

6. A stable, non-toxic, bodily-acceptable and assimilable, injectable fat emulsion comprising the following constituents in approximately the following proportions by weight/volume: 50% refined coconut oil having a solidification point of about 76° F.; 5% dextrose; 1½% glyceryl monostearate and 2% polyoxyethylene sorbitan monostearate having 20 polyoxyethylene units per molecule, the said emulsion being isotonic with blood and free from pyrogenic substances and having an average particle size smaller than 2 microns.

7. A stable, non-toxic, bodily-acceptable and assimilable, injectable fat emulsion comprising the following constituents in approximately the following proportions by weight/volume: 50% refined peanut oil; 5% invert sugar; 1% the condensation product of ethylene oxide and polypropylene glycol; 1% polyglycerol oleate, the said emulsion being sterile and free from pyrogenic substances and having an average particle size smaller than 2 microns.

8. A stable, non-toxic, bodily-acceptable and assimilable, injectable fat emulsion comprising the following constituents in approximately the following proportions by weight/volume: 50% refined sesame oil; 5% fructose; 1% polyoxyethylene sorbitan monostearate having 20 polyoxyethylene units per molecule; 1% the condensation product of ethylene oxide and polypropylene glycol; 1% polyethylene glycol 400 monostearate, the said emulsion being sterile and free from pyrogenic substances and having an average particle size smaller than 2 microns.

9. A stable, non-toxic, bodily-acceptable and assimilable, injectable fat emulsion comprising the following constituents in approximately the following proportions by weight/volume: 50% refined coconut oil having a solidification point of about 76° F.; 5% dextrose; 1½% polyethylene glycol 400 monostearate; 2% polyoxyethylene sorbitan monostearate having 20 polyoxyethylene units per molecule, the said emulsion being sterile and free from pyrogenic substances and having an average particle size smaller than 2 microns.

10. A stable, non-toxic, bodily-acceptable and assimilable, injectable fat emulsion comprising the following constituents in approximately the following proportions by weight/volume: 50% refined coconut oil having a solidification point of about 76° F.; 5% dextrose; 1½% polyethylene glycol 400 monostearate; 1% the condensation product of ethylene oxide and polypropylene glycol, the said emulsion being sterile and free from pyrogenic substances and having an average particle size smaller than 2 microns.

11. A process of producing a sterile, injectable fat emulsion as defined in claim 1, which comprises preliminarily treating the non-toxic fat with adsorbent carbon at an elevated temperature and thereafter subjecting it to filtration through a sterilizing filter, preliminarily sterilizing the monosaccharide in the form of a concentrated aqueous solution by heat treatment, preliminarily sterilizing the emulsifying agents by treating them in solution in an organic solvent with adsorbent carbon, followed by filtration through a sterilizing filter, and subsequently removing the solvent, and subsequently combining the thus pre-treated fat, the sterile aqueous monosaccharide solution, and the solid sterilized emulsifying agents with sufficient sterile water in such proportions as to produce the composition specified in claim 1, at a temperature above approximately 60° C., and subjecting the resulting emulsion at a temperature of approximately 60° C. to homogenization until the average size of the particles of the emulsion is less than approximately 2 microns.

12. A process of producing a sterile, non-toxic, injectable fat emulsion as defined in claim 6, which comprises preliminarily treating the coconut oil with adsorbent carbon at an elevated temperature and thereafter subjecting it to filtration through a sterilizing filter, preliminarily sterilizing the dextrose in the form of a concentrated aqueous solution by heat treatment, preliminarily sterilizing the emulsifying agents glyceryl monostearate and polyoxyethylene sorbitan monostearate having 20 polyoxyethylene units per molecule by treating them in solution in an organic solvent with adsorbent carbon, followed by filtration through a sterilizing filter, and subsequently removing the solvent, and subsequently combining the thus pre-treated coconut oil, the sterile aqueous dextrose solution and the solid, sterilized emulsifying agents with sufficient sterile water in such proportions as to produce the composition specified in claim 6, at a temperature above approximately 60° C., and subjecting the resulting emulsion at a temperature of approximately 60° C. to homogenization until the average size of the particles of the emulsion is less than approximately 2 microns.

13. A process of producing a sterile, non-toxic, injectable fat emulsion as defined in claim 7, which comprises preliminarily treating the peanut oil with adsorbent carbon at an elevated temperature and thereafter subjecting it to filtration through a sterilizing filter, preliminarily sterilizing the invert sugar in the form of a concentrated aqueous solution by heat treatment, preliminarily sterilizing the emulsifying agents the condensation product of ethylene oxide and polypropylene glycol and polyglycerol oleate by treating them in solution in an organic solvent with adsorbent carbon, followed by filtration through a sterilizing filter, and subsequently removing the solvent, and subsequently combining the thus pre-treated peanut oil, the sterile aqueous invert sugar solution and the solid, sterilized emulsifying agents with sufficient sterile water in such proportions as to produce the composition specified in claim 7, at a temperature above approximately 60° C., and subjecting the resulting emulsion at a temperature of approximately 60° C. to homogenization until the average size of the particles of the emulsion is less than approximately 2 microns.

14. A process of producing a sterile, non-toxic, injectable fat emulsion as defined in claim 8, which comprises preliminarily treating the sesame oil with adsorbent carbon at an elevated temperature and thereafter subjecting it to filtration through a sterilizing filter, preliminarily sterilizing the fructose in the form of a concentrated aqueous solution by heat treatment, preliminarily sterilizing the emulsifying agents polyoxyethylene sorbitan monostearate having 20 polyoxyethylene units per molecule, the condensation product of ethylene oxide and polypropylene glycol and polyethylene glycol 400 monostearate by treating them in solution in an organic solvent with adsorbent carbon, followed by filtration through a sterilizing filter, and subsequently removing the solvent, and subsequently combining the thus pre-treated sesame oil, the sterile aqueous fructose solution and the solid, sterilized emulsifying agents with sufficient sterile water in such proportions as to produce the composition specified in claim 8, at a temperature above approximately 60° C., and subjecting the resulting emulsion at a temperature of approximately 60° C. to homogenization until the average size of the particles of the emulsion is less than approximately 2 microns.

15. A process of producing a sterile, non-toxic, injectable fat emulsion as defined in claim 9, which comprises preliminarily treating the coconut oil with adsorbent carbon at an elevated temperature and thereafter subjecting it to filtration through a sterilizing filter, preliminarily sterilizing the dextrose in the form of a concentrated aqueous solution by heat treatment, preliminarily sterilizing the emulsifying agents polyethylene glycol 400 monostearate and polyoxyethylene sorbitan monostearate having 20 polyoxyethylene units per molecule by treating them in solution in an organic solvent with adsorbent carbon, followed by filtration through a sterilizing filter, and subsequently removing the solvent, and subsequently combining the thus pre-treated coconut oil, the sterile aqueous dextrose solution and the solid, sterilized emulsifying agents with sufficient sterile water in such proportions as to produce the composition specified in claim 9, at a temperature above approximately 60° C., and subjecting the resulting emulsion at a temperature of approximately 60° C. to homogenization until the average size of the particles of the emulsion is less than approximately 2 microns.

16. A process of producing a sterile, non-toxic, injectable fat emulsion as defined in claim 10, which comprises preliminarily treating the coconut oil with adsorbent carbon at an elevated temperature and thereafter subjecting it to filtration through a sterilizing filter, preliminarily sterilizing the dextrose in the form of a concentrated aqueous solution by heat treatment, preliminarily sterilizing the emulsifying agents polyethylene glycol 400 monostearate and the condensation product of ethylene oxide and polypropylene glycol by treating them in solution in an organic solvent with adsorbent carbon, followed by filtration through a sterilizing filter, and subsequently removing the solvent, and subsequently combining the thus pre-treated coconut oil, the sterile aqueous dextrose solution and the solid, sterilized emulsifying agents with sufficient sterile water in such proportions as to produce the composition specified in claim 10, at a temperature above approximately 60° C., and subjecting the resulting emulsion at a temperature of approximately 60° C. to homogenization until the average size of the particles of the emulsion is less than approximately 2 microns.

References Cited in the file of this patent

Holman et al.: Progress in the Chemistry of Fats and Other Lipids, Bergman Press, N. Y., 1955, pages 2–17.

Goldberg: Journal American Medical Association, vol. 150, No. 17, pages 1665, December 27, 1952.

Dunham: Archives of Surgery, vol. 48 (1944), pages 395–397.

Meng: Jour. Lab. and Clin. Med., vol. 33 (1948), pp. 689–705.

Mann: Ibid., vol. 34 (1949), page 699.